US011902284B2

(12) United States Patent
Du et al.

(10) Patent No.: US 11,902,284 B2
(45) Date of Patent: Feb. 13, 2024

(54) TENANT USER MANAGEMENT IN CLOUD DATABASE OPERATION

(71) Applicant: SAP SE, Walldorf (DE)

(72) Inventors: Long Du, Xi'an (CN); Haoxing Hou, Xi'an (CN); Le Zhang, Xi'an (CN); Jun Zhang, Xi'an (CN)

(73) Assignee: SAP SE, Walldorf (DE)

(*) Notice: Subject to any disclaimer, the term of this patent is extended or adjusted under 35 U.S.C. 154(b) by 494 days.

(21) Appl. No.: 17/194,141

(22) Filed: Mar. 5, 2021

(65) Prior Publication Data

US 2022/0286465 A1    Sep. 8, 2022

(51) Int. Cl.
*H04L 9/40* (2022.01)
*G06F 21/62* (2013.01)
*H04L 9/32* (2006.01)

(52) U.S. Cl.
CPC ........ *H04L 63/105* (2013.01); *G06F 21/6218* (2013.01); *H04L 9/32* (2013.01); *H04L 63/08* (2013.01)

(58) Field of Classification Search
CPC ...... H04L 63/105; H04L 9/32; G06F 21/6218
See application file for complete search history.

(56) References Cited

U.S. PATENT DOCUMENTS

| 7,082,532 | B1 * | 7/2006 | Vick | H04L 63/0815 |
| | | | | 713/157 |
| 8,909,635 | B2 * | 12/2014 | Petri | G06F 16/907 |
| | | | | 707/732 |
| 9,843,587 | B2 * | 12/2017 | Meunier | G06F 21/10 |
| 9,992,186 | B1 * | 6/2018 | Drozd | H04L 63/102 |
| 10,044,723 | B1 * | 8/2018 | Fischer | H04L 63/102 |
| 10,581,867 | B2 * | 3/2020 | Srinivasan | H04L 63/10 |
| 2007/0033393 | A1 * | 2/2007 | Ganesan | H04L 9/3226 |
| | | | | 713/155 |
| 2009/0235346 | A1 * | 9/2009 | Steinberg | G06F 21/445 |
| | | | | 726/8 |

(Continued)

FOREIGN PATENT DOCUMENTS

WO    WO2018/053337 A1    3/2018

OTHER PUBLICATIONS

B. Alouffi, M. Hasnain, A. Alharbi, W. Alosaimi, H. Alyami and M. Ayaz, "A Systematic Literature Review on Cloud Computing Security: Threats and Mitigation Strategies," in IEEE Access, vol. 9, pp. 57792-57807, 2021. (Year: 2021).*

(Continued)

*Primary Examiner* — Kari L Schmidt
(74) *Attorney, Agent, or Firm* — Klarquist Sparkman, LLP

(57) ABSTRACT

A method of tenant user management in cloud database operation can be implemented. The method can receive an original job request from a user for a database service, wherein the original job request can include a login credential of the user. The method can authenticate the login credential of the user by a scheduler, verify the user has privileges for the original job request by the scheduler, create a modified job request from the original job request by the scheduler based on a predefined role corresponding to the privileges of the user, send the modified job request from the scheduler to a database service platform, and allocate an instance of database service to the user in response to the modified job request.

13 Claims, 11 Drawing Sheets

(56) References Cited

U.S. PATENT DOCUMENTS

| | | | | |
|---|---|---|---|---|
| 2011/0247059 | A1* | 10/2011 | Anderson | G06F 21/62 |
| | | | | 726/6 |
| 2012/0149325 | A1* | 6/2012 | Titus | H04M 11/04 |
| | | | | 455/404.2 |
| 2013/0007062 | A1* | 1/2013 | Dutta | G06F 16/215 |
| | | | | 707/E17.055 |
| 2013/0151680 | A1* | 6/2013 | Salinas | G06F 16/211 |
| | | | | 709/223 |
| 2013/0332618 | A1* | 12/2013 | Kasivajjula | H04L 67/146 |
| | | | | 709/228 |
| 2016/0173500 | A1 | 6/2016 | Sharabi et al. | |
| 2018/0131517 | A1* | 5/2018 | Block | H04L 9/3226 |
| 2018/0367339 | A1* | 12/2018 | Kleingeld-Mackenzie | |
| | | | | H04L 12/4633 |
| 2019/0199708 | A1* | 6/2019 | Das | G06F 9/45558 |
| 2019/0370484 | A1* | 12/2019 | Klein | G06F 21/6227 |
| 2020/0007530 | A1* | 1/2020 | Mohamad Abdul | |
| | | | | H04W 12/084 |
| 2020/0076817 | A1* | 3/2020 | Gupta | G06F 21/41 |
| 2020/0186515 | A1* | 6/2020 | Bansal | G06F 9/5027 |
| 2021/0326218 | A1* | 10/2021 | Rachapudi | G06F 11/3006 |
| 2022/0141212 | A1* | 5/2022 | Kumar | H04L 63/0807 |
| | | | | 726/4 |

OTHER PUBLICATIONS

Rijah, Muhammed. "An Analysis of Security Issues in Cloud Databases." (2021). (Year: 2021).*

Rassam, Murad, Aishah Alfarhan, and Reem Alhussain. "Cloud Database Security Issues and Challenges: A Review." Journal of Innovative Information and Communication Technology 1.1 (2021): 21-31. (Year: 2021).*

"Communication—Extended European Search Report" from the European Patent Office for European Application No. EP21213200. 5-1213, dated Jun. 3, 2022, 7 pages.

Ajmal Abbasi, "An Overview of One-Way SSL and Two-Way SSL," TutorialsPedia, https://tutorialspedia.com/an-overview-of-one-way-ssl-and-two-way-ssl, printed Jan. 2, 2021, 8 pages.

Database Administrator's Guide, "Scheduler Concepts," Oracle Help Center, https://docs.oracle.com/cd/B19306_01/server.102/b14231/schedover.htm, on or before Mar. 4, 2021, 9 pages.

Database Security Guide, "Configuring Privilege and Role Authorization," https://docs.oracle.com/cd/B28359_01/network.111/b28531/authorization.htm, Oracle Help Center, printed Feb. 9, 2021, 88 pages.

Faroog et al., "Database as a Service Concepts—360 Degrees," DBaaS—A Special Case of Cloud Computing, Building Database Clouds in Oracle 12c, https://www.informit.com/articles/article.aspx?p=2521584&seqNum=2, Sep. 14, 2016, 3 pages.

Rami Honig, What is Database-as-a-Service (DBaaS)?, Stratoscale, https://www.stratoscale.com/blog/dbaas/what-is-database-as-a-service, printed Jan. 21, 2021, 10 pages.

Ariel Maislos, What to Consider When Using DBaaS Around the World, DataCenter Knowledge, https://www.datacenterknowledge.com/archives/2017/05/02/consider-using-dbaas-around-world, printed Jan. 1, 2021, 13 pages.

"What is Database Clustering—Introduction and brief explanation," NDZ, https://www.ndimensionz.com/2018/01/05/what-is-database-clustering-introduction-and-brief-explanation, printed Jan. 2, 2021, 4 pages.

"Scheduler Architecture," Oracle Database Administrator's Guide 11g Release 2 (11.2), https://docs.oracle.com/cd/E18283_01/server.112/e17120/schedover004.htm, printed Feb. 6, 2021, 5 pages.

"SQL Grant, Revoke, Privileges and Roles," Beginner SQL Tutorial, https://beginner-sql-tutorial.com/sql-grant-revoke-privileges-roles.htm, printed Feb. 6, 2021, 6 pages.

* cited by examiner though the DBaaS includes many database clusters (which may be geographically distributed), can be expensive. The complexity of tenant user management in a distributed cloud computing environment can be markedly increased due to a variety of reasons, such as the exponential growth of user base and the deployment of multiple distributed DBaaS platforms. When many end users send job requests to multiple DBaaS platforms for different services, security risks can arise, and privilege management can be complicated.

TENANT USER MANAGEMENT IN CLOUD DATABASE OPERATION

BACKGROUND

Tenant user management in a cloud foundry is a fundamental task. Contemporary, rapid response to the cloud foundry requirements and potential security risks make the cloud database complicated for users to use. Further, the resource race and database service preparation on the cloud platform makes it challenging for job scheduling and quality assurance. Accordingly, there is room for improved tenant user management in cloud database operations.

DETAILED DESCRIPTION

Figure 1:
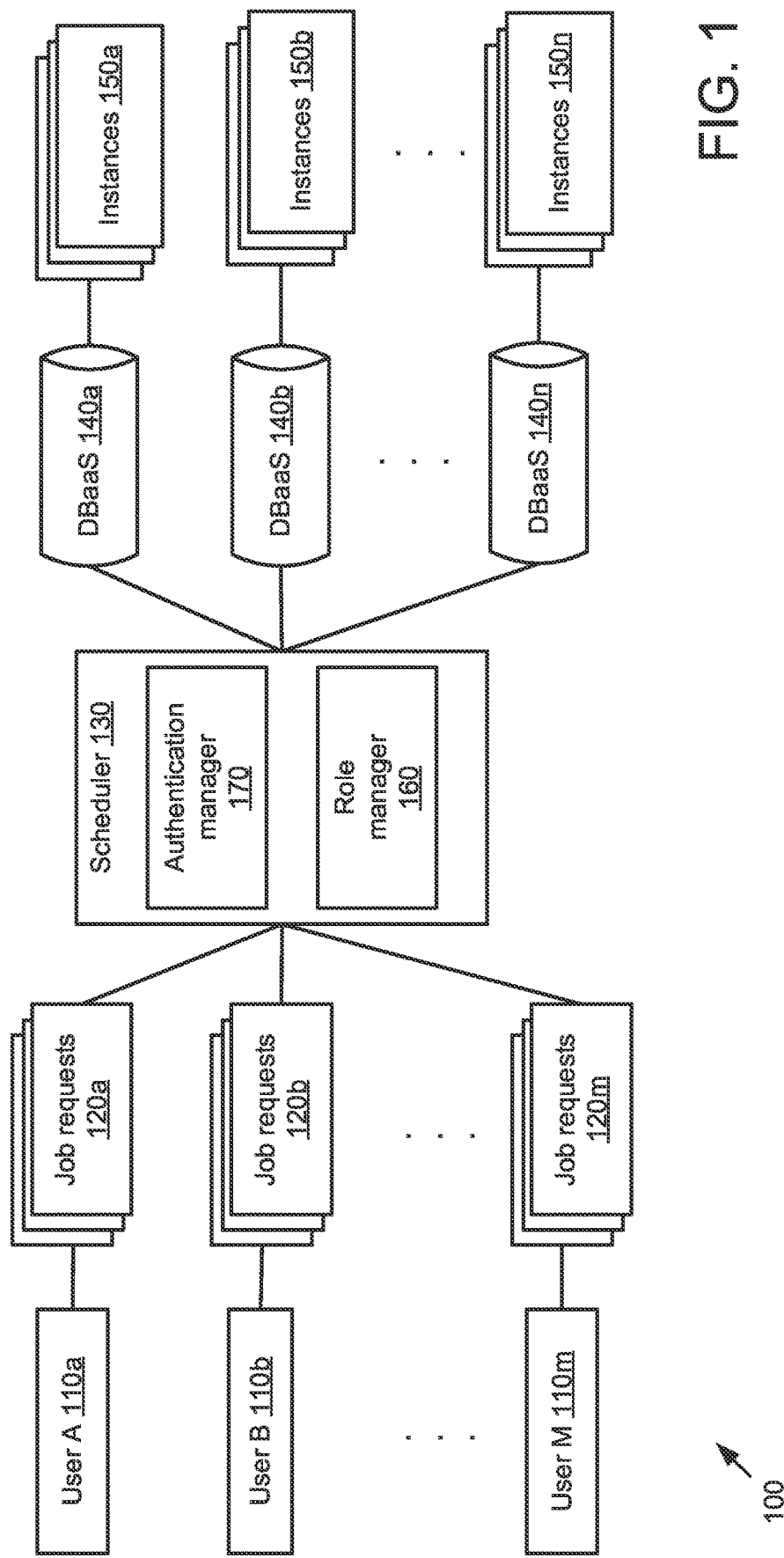
FIG. 1 is an overall block diagram of an example computing system configured to implement an improved tenant user management technology in cloud database operation.

Example 1—Overview of Tenant User Management in Cloud Computing Environment

Multitenancy is a feature in many types of cloud computing services, where a service provider can support multiple clients of different customers (called "tenants") within a cloud solution. In a database-as-a-service (DBaaS) environment, multitenancy means that the cloud solution can support multiple users accessing multiple databases from multiple tenants, and each tenant can have one or more databases. Users can be grouped into the multiple tenants, where users of a tenant can share a common access with certain specific privileges to the DBaaS instances. Users who consume services do not need to manage the availability of resources or capacity-related issues (e.g., CPU consumption, storage consumptions, backup service consumption, network bandwidth consumption, etc.). Instead, such tasks are managed by DBaaS service providers. Thus, a cloud service supported by DBaaS can be attractive to end users because it can offer benefits of low maintenance cost, overall reliability, high elasticity, etc.

From the DBaaS service provider's perspective, however, management of large-scale databases on cloud, especially when the DBaaS includes many database clusters (which may be geographically distributed), can be expensive. The complexity of tenant user management in a distributed cloud computing environment can be markedly increased due to a variety of reasons, such as the exponential growth of user base and the deployment of multiple distributed DBaaS platforms. When many end users send job requests to multiple DBaaS platforms for different services, security risks can arise, and privilege management can be complicated.

As one example, secure authentication of many users by corresponding DBaaS platforms can be a challenging task. All end users must safeguard their login credentials and may be required to update them frequently. It is not uncommon that users may inadvertently expose their passwords to others or lose their credential data for various reasons.

As another example, end users can have different user privileges and their job requests may have different priorities and demand different resources. One particular challenge can come from the agile development cycle. For example, if a cloud database cluster is used by multiple teams and/or different team members, the privileges for each team and/or team member to use the database cluster needs to be individually managed, thus leading to increased communication cost. The challenge can also come from variation of resource usage and different roles played by end users. For example, developers, testers, and customers can each have their own unique configurations for using the database clusters. Conventionally, user's privilege management is performed at the kernel of the database management system. For example, individual user's privilege can be configured by one or more SQL commands (e.g., GRANT and REVOKE) to provide or remove particular privileges (e.g., INSERT, UPDATE, SELECT, DELETE, etc.) for accessing a particular database. As the databases are moved to the cloud environment, software applications, as well as database and cluster management are deployed as the DBaaS to support more users and easier usage. However, such change is accompanied by new challenges to cloud database providers because conventional method of user privilege management is hard to scale in the complicated DBaaS platform. For example, still relying on the database management system kernel to manage each user's privilege becomes untenable because such task can reduce or even deplete the computing resources of the database management system. In another example, the privileges to be managed are not limited to conventional database access rights, instead they can include access rights to some DBaaS specific features that cannot be directly authorized by the database kernel, such as the right to access database explorer (for DBaaS administrative tasks), the right to access certain DBaaS based enterprise software application, the right to access an extraordinarily large amount of memory (e.g., >1 TB), the right to clustering/replication, etc.

Thus, it would be advantageous for an improved tenant user management system in the DBaaS environment that can mitigate users' security vulnerability and more efficiently manage users' privileges. Such improved tenant user management technologies can be applied across a wide variety of enterprise software environments.

Example 2—Example Overview System for Improved Tenant User Management in Cloud Database Operation FIG. 1 shows an overall block diagram of an example database system 100 configured to implement an improved tenant user management technology in a cloud foundry environment.

As shown, the database system 100 can include a plurality of DBaaS platforms 140a, 140b, ..., 140n (collectively 140), each of which can respectively instantiate a plurality of instances 150a, 150b, ..., 150n (collectively 150). In a typical example, the DBaaS platforms 140 can provide a web-based administration tool for the administration, monitoring, and maintenance of enterprise databases in a cloud computing environment. For example, each DBaaS platform (e.g., 140a, 140b, ..., 140n) can provide a single point of access to a range of tools for a cluster of databases, and also integrates development capabilities required by administrators through a database explorer or browser. In addition, the DBaaS platforms 140 can also start and stop services, monitor the underlying databases, configure database settings, and manage users and authorizations.

As depicted in FIG. 1, the database system 100 can support a plurality of users 110a, 110b, ..., 110m (collectively 110). In some examples, the users 110 can be grouped into different tenants, each of which can have tenant-specific roles and/or privileges. Each user can respectively send one or more job requests (also referred to as "service requests"), e.g., 120a, 120b, ..., 120m (collectively 120), for database services from the DBaaS platforms 140. The database system 100 can further include a scheduler 130 serving as an intermediary between the job requests 120 sent by users 110 and the DBaaS platforms 140. Receiving a job request 120 from a user 110, the scheduler 130 can, after authenticating the user and validating the user's privileges, determine which DBaaS platform 140 should be used to serve the job request 120 based on a number of factors, e.g., the location of the user 110 and its proximity to the DBaaS platform 140, the computing resources required by the job request 120, etc. The DBaaS platform 140 selected by the scheduler 130 can then determine which instance(s) 150 need to be assigned to the user 110 so that the assigned instance(s) 150 can cooperate to execute a job that satisfies the job request 120 while balancing the load on the corresponding DBaaS platform 140. Generally, the scheduler 130 can schedule execution of jobs (e.g., determining the time and/or sequence of job execution), and enable limited computing resources to be allocated appropriately among competing jobs. Since a job can undergo multiple states from its creation to its completion, the scheduler 130 can also track the execution of jobs and log related information (e.g., job status, the last run time of the job, etc.).

As described herein, the scheduler 130 can be configured to implement additional, advanced, technological features beyond traditional platform selection and job scheduling functions. Specifically, the scheduler 130 can include an authentication manager 170 configured to implement triple-site user authentication, and a role manager 160 configured to implement role-based user privilege management, as described more fully below.

In practice, the systems shown herein, such as system 100, can vary in complexity, with additional functionality, more complex components, and the like. For example, there can be additional functionality within the scheduler 130. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the job requests, the user's credentials, the public and/or private keys, the roles, and the like can be stored in one or more computer-readable storage media or computer-readable storage devices. The technologies described herein can be generic to the specifics of operating systems or hardware and can be applied in any variety of environments to take advantage of the described features.

Figure 2:
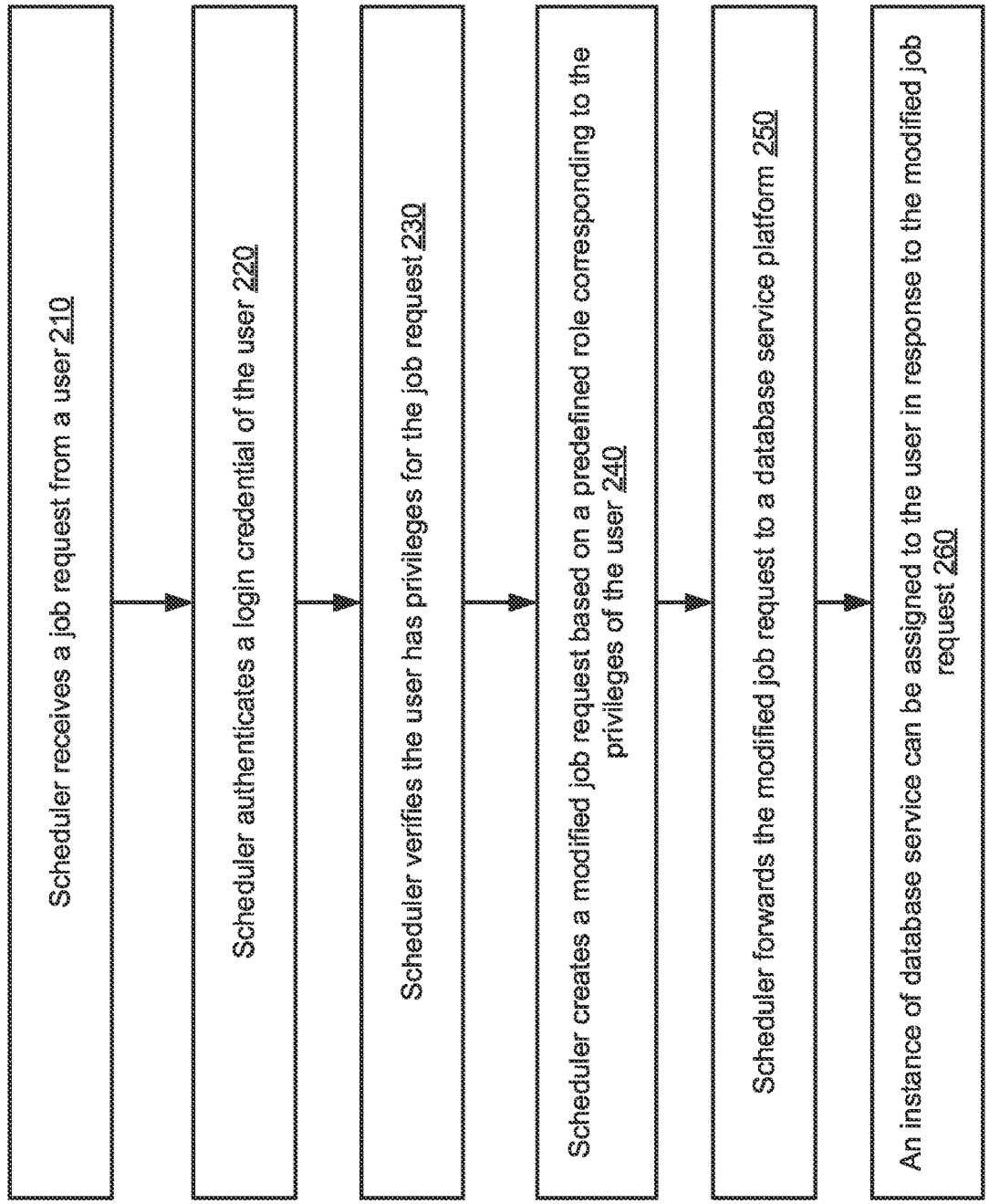
FIG. 2 is a flowchart illustrating an example overall method of implementing the improved tenant user management technology in cloud database operation.

Example 3—Example Overall Method for Improved Tenant User Management in Cloud Database Operation FIG. 2 is a flowchart of an example overall method 200 of implementing the improved tenant user management technology in a cloud foundry environment and can be performed, for example, by the system of FIG. 1.

At 210, the scheduler (e.g., 130) can receive a job request (e.g., 120) from a user (e.g., 110) for a database service. At 220, the scheduler can authenticate a login credential of the user, e.g., by means of triple-site authentication described below. At 230, the schedule can further verify that the user has privileges for the job request. At 240, the scheduler can create a modified job request based on a predefined role corresponding to the privileges of the user. At 250, the scheduler can forward the modified job request to a selected DBaaS platform (e.g., 140). Then at 260, an instance of database service can be assigned to the user in response to the modified job request. For example, the DBaaS platform can allocate or assign an instance of database service to the user in response to the modified job request.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 4—Example Triple-Side Authentication Scheme

Figure 3:
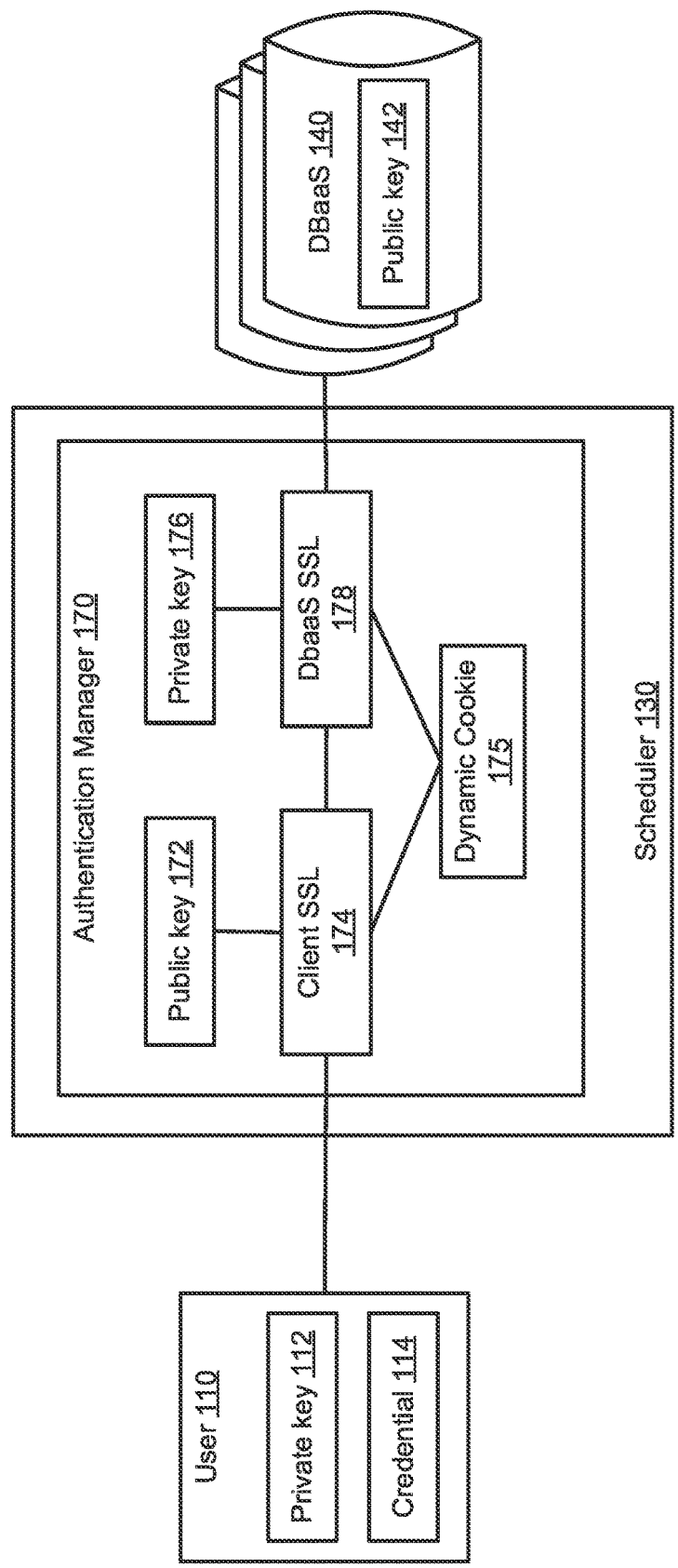
FIG. 3 is an example block diagram illustrating an example triple-side authentication.

FIG. 3 is a block diagram 300 illustrating an example triple-side authentication scheme according to the disclosed technology.

As shown, the depicted authentication scheme involves three sides: the user 110, the scheduler 130, and the DBaaS platform 140. Before the user 110 can use any database services provided by a DBaaS platform 140, the user 110 must be authenticated by the scheduler 130 and the scheduler 130 must be authenticated by the DBaaS platform 140.

In some embodiments, two-way secure socket layer (SSL) authentication, also referred to as mutual authentication, can be performed between the user 110 and the scheduler 130, and/or between the scheduler 130 and the DBaaS platform 140. Such triple-side authentication can be supported by the authentication manager 170 contained in the scheduler 130.

In certain examples, the user 110 and the scheduler 130 can authenticate each other to ensure that both parties involved in the communication are trusted. Specifically, the authentication manager 170 can hold a public key 172, which, through a client SSL 174, can be paired with a private key 112 held by the user 110 to authenticate the user's login credential 114 (e.g., username and password). Typically, the user's private key 112 and login credential 114 can be included in the job request 120 sent by the user 110. As described below, the scheduler 130 can specify an encryption algorithm which is used to encrypt the user's login credentials. Likewise, the scheduler 130 and the DBaaS platform 140 can verify the identity of each other. For example, the authentication manager 170 can hold a private key 176, which, through a DBaaS SSL 178, can be paired with a public key 142 held by the DBaaS platform 140 so that the scheduler 130 can be authenticated by the DBaaS platform 140.

In addition, the authentication manager 170 can maintain a dynamic cookie 175. Specifically, after the user's authentication has been verified by the scheduler 130, the authentication manager 170 can create the dynamic cookie 175, which contains encrypted login credential 114 of the user 110 and can be used for scheduling future jobs of the user 110 (e.g., the authentication of the user 110 can be automatically verified by using the user's private key 112 to decrypt the user's login credential 114 contained in the dynamic cookie 175). The user's login credential 114 can have a predefined validity period (e.g., one week, etc.) set by the DBaaS platform 140 and administered by the scheduler 130. In other words, the user 110 can be required to periodically update or change his login credential 114 in order to use the services provided by the DBaaS platform 140. After the expiration of the validity period, the previously created dynamic cookie 175 will fail to authenticate the user 110. Thus, the user 110 needs to be re-authenticated by the scheduler 130 in order to access the DBaaS platform 140. In certain embodiments, the predefined validity period can be cut short when certain activities are detected (e.g., an abnormal or suspicious pattern of usage of database resources, etc.). In such circumstances, the DBaaS platform 140 can instruct the scheduler 130 to re-authenticate the user 110. In certain examples, the scheduler 130 can generate a dynamic passcode, e.g., a random string that expires within a short time period (e.g., 5 minutes, etc.). The dynamic passcode can be sent to the user, e.g., via SMS or email, to verify the user's identity and/or prompt the user to change his login credentials. After a successful re-authentication, the scheduler 130 can update or refresh the dynamic cookie 175 so that it contains the user's updated login credential 114 so that it can be used again for scheduling future jobs of the user 110. Note that the dynamic cookie 175 is stored on the scheduler 130, not on local computers of the user, thus the risk of exposing the user's login credential (e.g., via decryption of the cookie) can be reduced.

In other words, the task of user authentication for using the services provided by the DBaaS platform 140 can be a part of the triple-side authentication scheme depicted in FIG. 3 and enabled by the authentication manager 170. Such authentication scheme can be implemented through a protocol administered by the scheduler 130, where the protocol specifies the encryption algorithm used for encrypting the user's login credential, the validity period of user's login credential specified by the DBaaS platform, the algorithm to generate the dynamic passcode, etc. Thus, in contrast to the conventional cloud database operations where a DBaaS platform is usually responsible for authenticating thousands or more users, the triple-side authentication scheme described herein is more secure through an added authentication layer (i.e., the scheduler 130) and the dynamic cookie mechanism. Further, the triple-side authentication scheme can improve the overall efficiency by offloading the voluminous user authentication tasks to the scheduler 130, while the DBaaS platform 140 only needs to authenticate the scheduler 130.

Example 5—Example Overall Method of User Authentication Based on Dynamic Cookie

Figure 4:
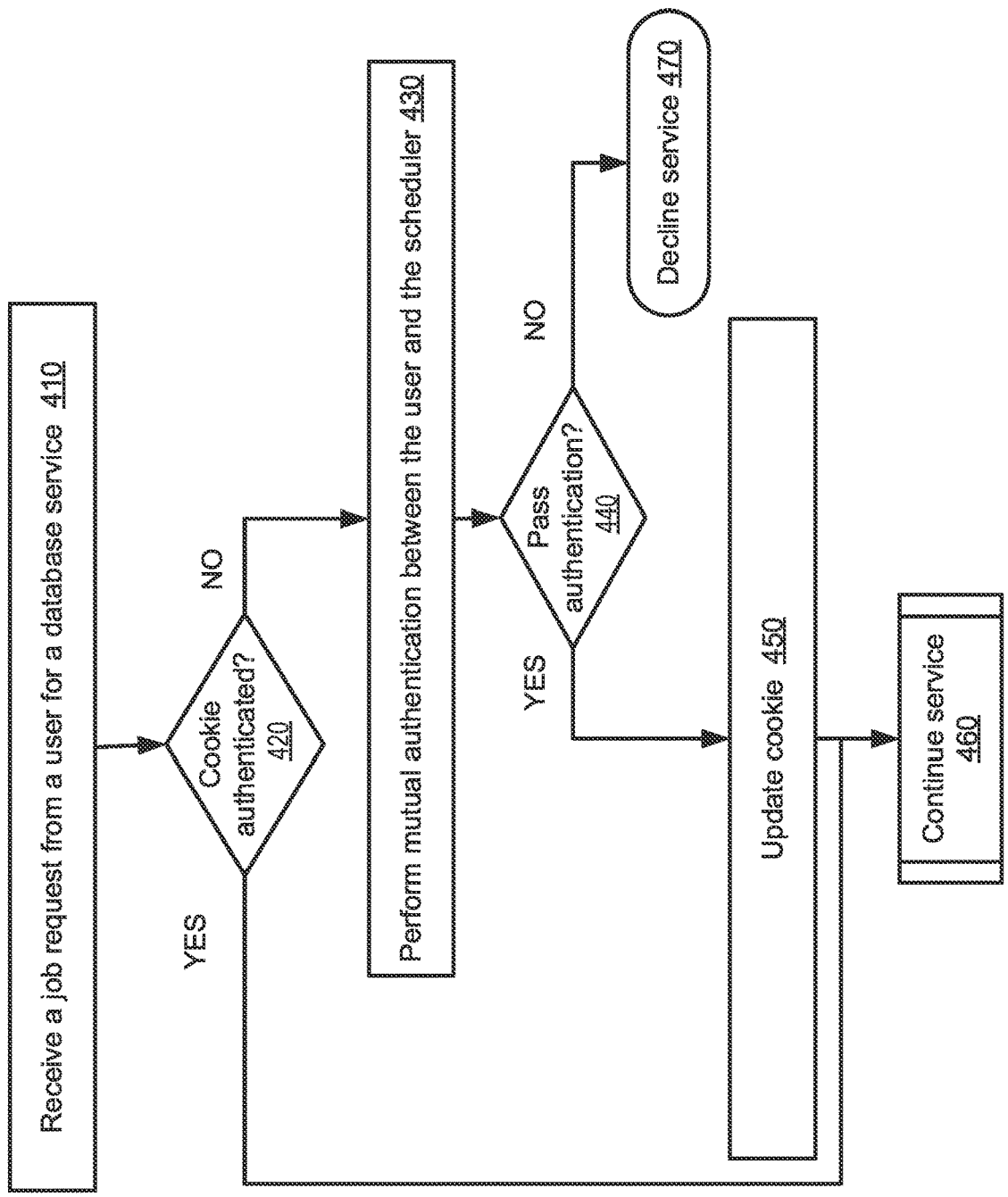
FIG. 4 is a flowchart illustrating an example method of implementing a dynamic cookie used in conjunction with user authentication by a scheduler.

FIG. 4 shows a flowchart 400 illustrating an example overall method of user authentication based on a dynamic cookie (e.g., 175).

At 410, the scheduler (e.g., 130) can receive a job request (e.g., 120) from a user (e.g., 110) for a database service. At 420, the authentication manager (e.g., 170) can perform cookie authentication, i.e., to determine if the user's private key (e.g., 112) can properly decrypt the user's login credential (e.g., 114) contained in the dynamic cookie. If the dynamic cookie is successfully authenticated, the method can continue services at 460 (e.g., checking user's privileges against the job request, as described further below). On the other hand, if the authentication manager fails to authenticate the user using the dynamic cookie, the method can go to 430 to perform user authentication by the scheduler, as described further in the following Example. The result of such user authentication can be checked at 440. If such authentication is successful, the scheduler can update the dynamic cookie at 450 and continue services at 460. Otherwise, the user's service request will be declined at 470.

Example 6—Example Method of User Authentication by Scheduler

Figure 5:
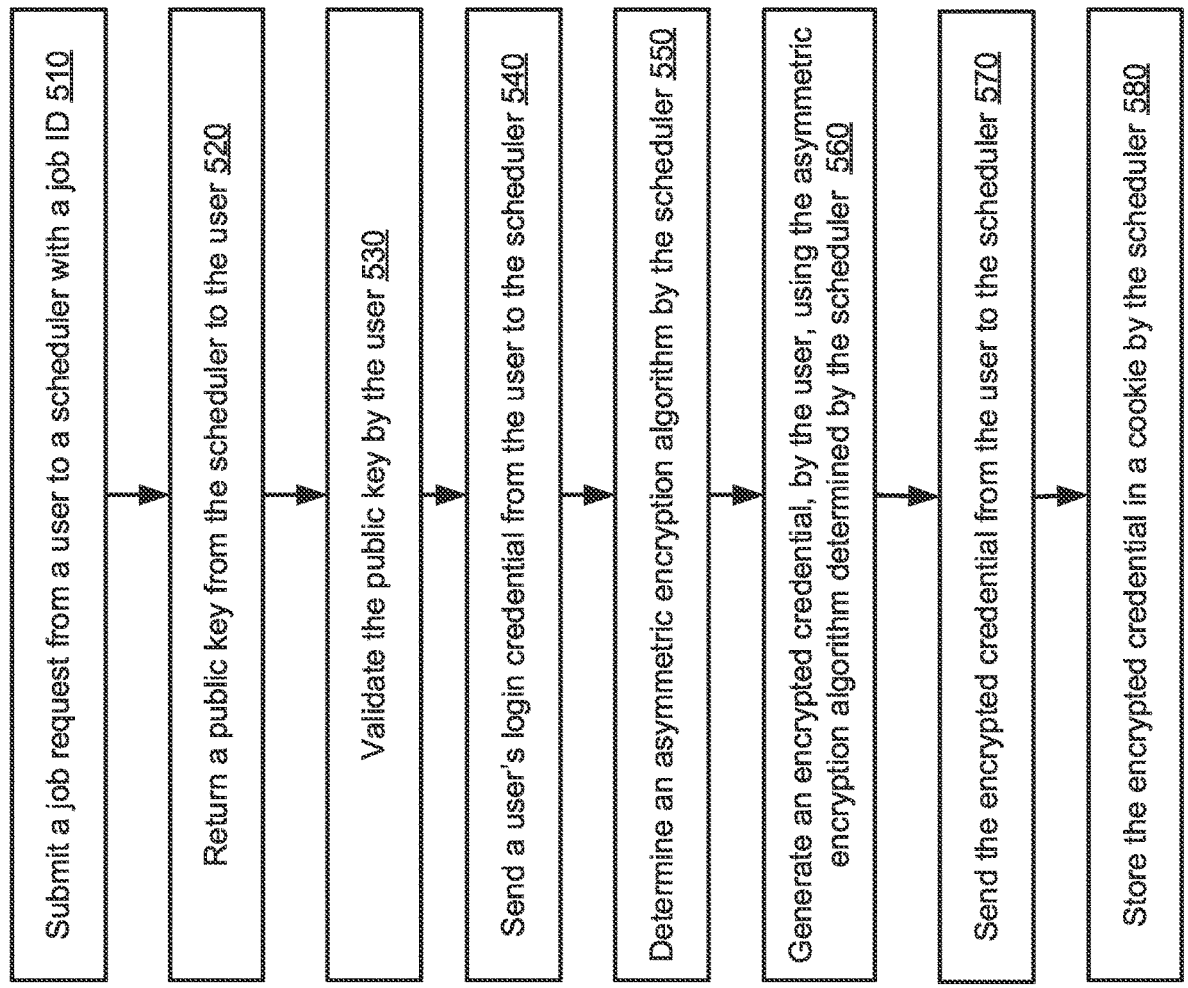
FIG. 5 is a flowchart illustrating an example method of authenticating a user by a scheduler.

FIG. 5 is a flowchart 500 illustrating an example method of authenticating a user (e.g., 110) by a schedule (e.g., 130).

At 510, the user can submit a job request (e.g., 120) to the scheduler with a job identifier (ID). The job ID can include a timestamp and other job description information, and can be generated in a random manner and/or sequentially. At 520, the scheduler can return or send its public key (e.g., 172) to the user. At 530, the user can validate the scheduler's public key, e.g., by verifying the scheduler's public key through a certification authority. After such validation is successful, at 540, the user can send his login credential (e.g., 114) to the scheduler. At 550, the scheduler can select or determine an asymmetric encryption algorithm (e.g., Digital Signature Algorithm, RSA algorithm, etc.) for the user. At 560, the user can generate an encrypted login credential using the asymmetric encryption algorithm selected or determined by the scheduler. Then at 570, the user can send his encrypted login credential to the scheduler. After receiving the user's encrypted login credential, the scheduler can preserve such information in the dynamic cookie at 580 for future cookie-based authentication purpose, i.e., when there are following job requests by the user requiring such a login credential, the scheduler can decrypt it using his private key.

Example 7—Example Overview of Role-Based
User Privilege Management

Figure 6:
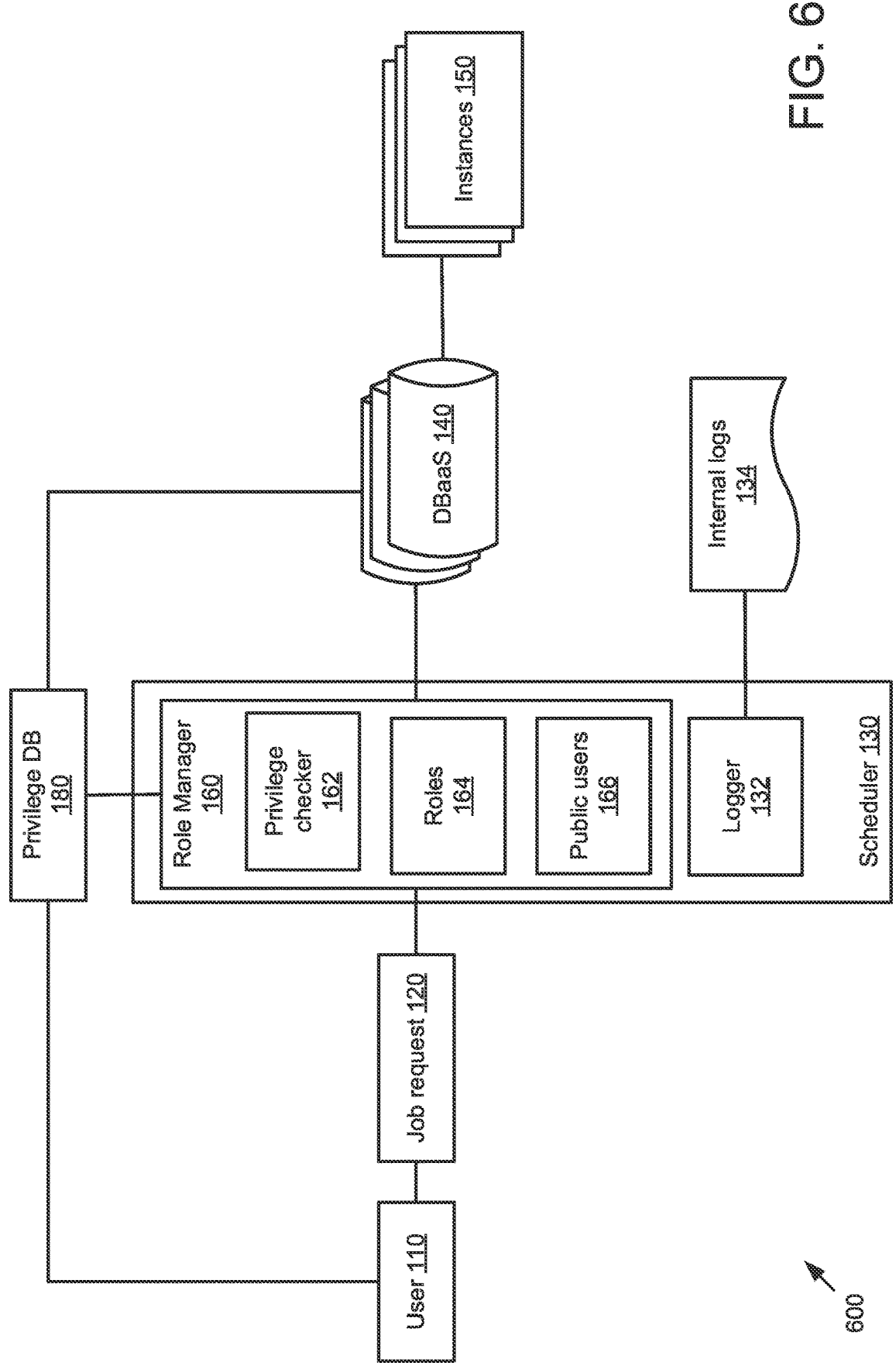
FIG. 6 is a block diagram illustrating an example system for role-based user privilege management.

FIG. 6 a block diagram 600 illustrating an example system for role-based user privilege management.

As shown, the scheduler 130 includes a role manager 160 which can serve as an intermediary between the job request 120 sent by the user 110 and the DBaaS platform 140. The role manager 160 can include a privilege checker 162, a plurality of predefined roles 164, and a plurality of predefined public users 166 associated with or mapped to the predefined roles 164. As described herein, public users 166 are virtual users existing only in the scheduler 130 and have their own encrypted, pre-authenticated login credentials. The default or assigned privilege information of all users of the DBaaS platform 140 can be saved in a privilege database 180, which can be assessed by the privilege checker 162. In addition, the scheduler 130 can include a logger 132 configured to create internal logs 134 to record certain information about job sessions corresponding to the job request 120.

As described herein, privileges of the user 110 define the user's access rights to services of the DBaaS platform 140. As in conventional database management systems, user privileges can include specific privileges of the user 110 to operate directly on database objects, such as system privileges of creating, altering, and/or dropping database tables, and/or object privileges of selecting or updating records in database tables, etc. Unlike conventional database management systems, user privileges described herein can be more expansive and include access rights to DBaaS platform specific features, such as the right to visit DBaaS platform administration website (e.g., the SAP HANA Cockpit provided by SAP SE, of Walldorf, Germany), the right to create a private cloud, the right to visit DBaaS internal docker, etc.

In certain embodiments, the user's job request 120 can specify and/or define a list of requested privileges for the job, e.g., in a configuration format. As an example, one such privilege configuration can be: {disk: 128 GB; memory: 32 GB; CPU: 16; operation: r+w; explorer: yes; administrator explorer: no; ERP: no}, which specifies that the job request seeks 128 GB disk space, 32 GB memory space, 16 CPUs, read and write access rights to the database, and the access right to the regular database explorer, but does not seek the access right to the administrative database explorer or the enterprise resource planning (ERP) software application. As described below, the privilege checker 162 can analyze the job request 120 to compare user requested privileges with his assigned privileges to determine the validity of the job request 120.

As described herein, roles 164 are combinations of users' privileges described above. Different roles generally have different combinations of user's privileges, and the number of privileges contained in the roles can vary. For example, one role can include a combination of multiple privileges (e.g., the privileges to insert, update, select, or delete certain database records, and the privileges to visit DBaaS platform administration website), whereas another role can include only a single privilege (e.g., the privilege to select certain database records). In one example embodiment, the plurality of predefined roles 164 can be saved in respective configuration files located on the scheduler 130.

Figure 7:
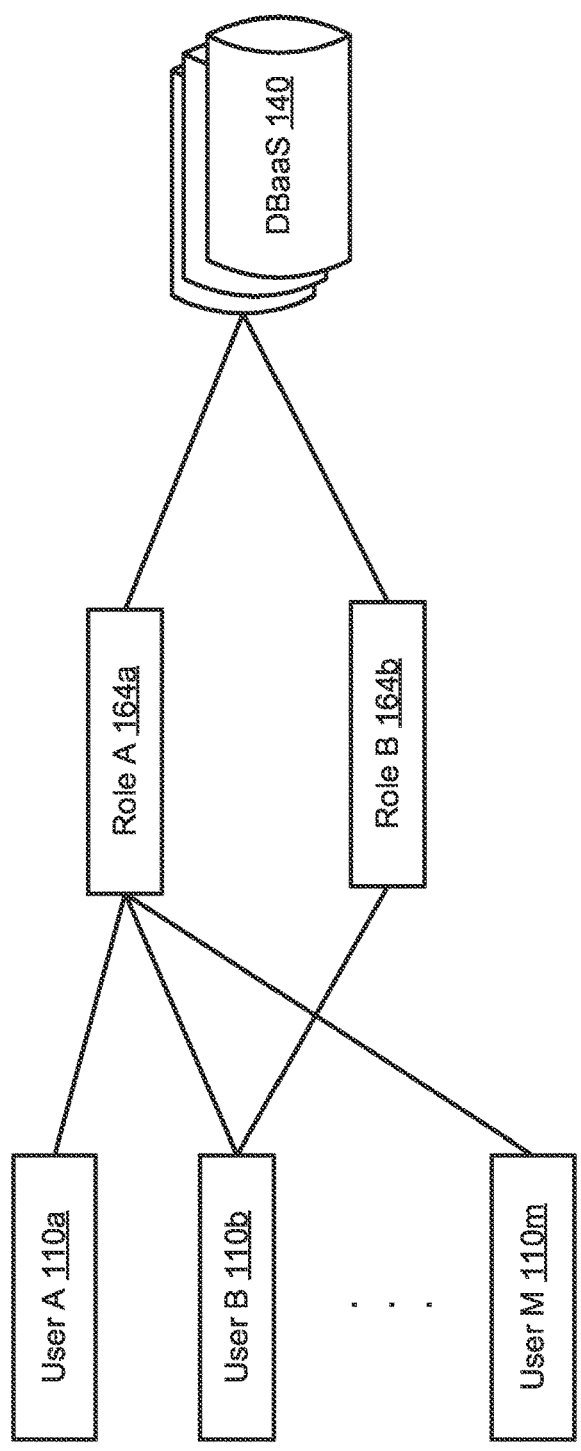
FIG. 7 is a block diagram illustrating an example topographic mapping between users, roles, and database services.

In an example embodiment, the plurality of roles 164 predefined by the scheduler 130 can cover all possible combinations of users' privileges for using all available services provided by the DBaaS platform 140. In other words, each user 110 can be mapped to one or more roles 164 predefined by the scheduler 130. FIG. 7 is a block diagram 700 illustrating an example mapping between users 110, roles 164, and the DBaaS platform 140. In the depicted example, two predefines roles A 164a and B 164b are shown, each containing a respective combination of privileges for certain services provided by the DBaaS platform 140. As illustrated, both user A 110a and user M 110m are mapped to the predefined role A 164a, indicating the combination of privileges contained in role A 164a can cover the access rights of both user A 110a and user M 110m. In other words, user A 110a and user M 110m share the same privileges contained in role A 164a. On the other hand, user B 110b is mapped to both role A 164a and role B 164b, indicating that the user B 110b needs the privileges contained in both roles A and B in order to use services provided by the DBaaS platform 140. The user-role mapping described herein establishes a protocol through which the DBaaS platform can manage users' privileges.

Because the total number of privileges for assessing the DBaaS platform 140 is generally limited (e.g., less than 100) and the roles 164 represent various combinations of users' privileges, the total number of predefined roles 164 is also generally limited (e.g., a few hundreds), which can be significantly smaller (e.g., by a few orders of magnitude) than the total number of users (e.g., millions) of the DBaaS platform 140. Thus, by mapping different users 110 to respective roles 164 predefined by the scheduler 130, a significant dimension reduction can be achieved for user privilege management. For example, in contrast to conventional approaches where the database management system kernel is responsible for verifying each user's privileges, the technology described herein can free the DBaaS platform 140 from direct interaction with the users 110 and offload the task of user privilege management to the scheduler 130, which can map a large cohort of users 110 to a much smaller, and thus more manageable, set of predefined roles 164.

Example 8—Example Method of Role-based User
Privilege Management

Figure 8:
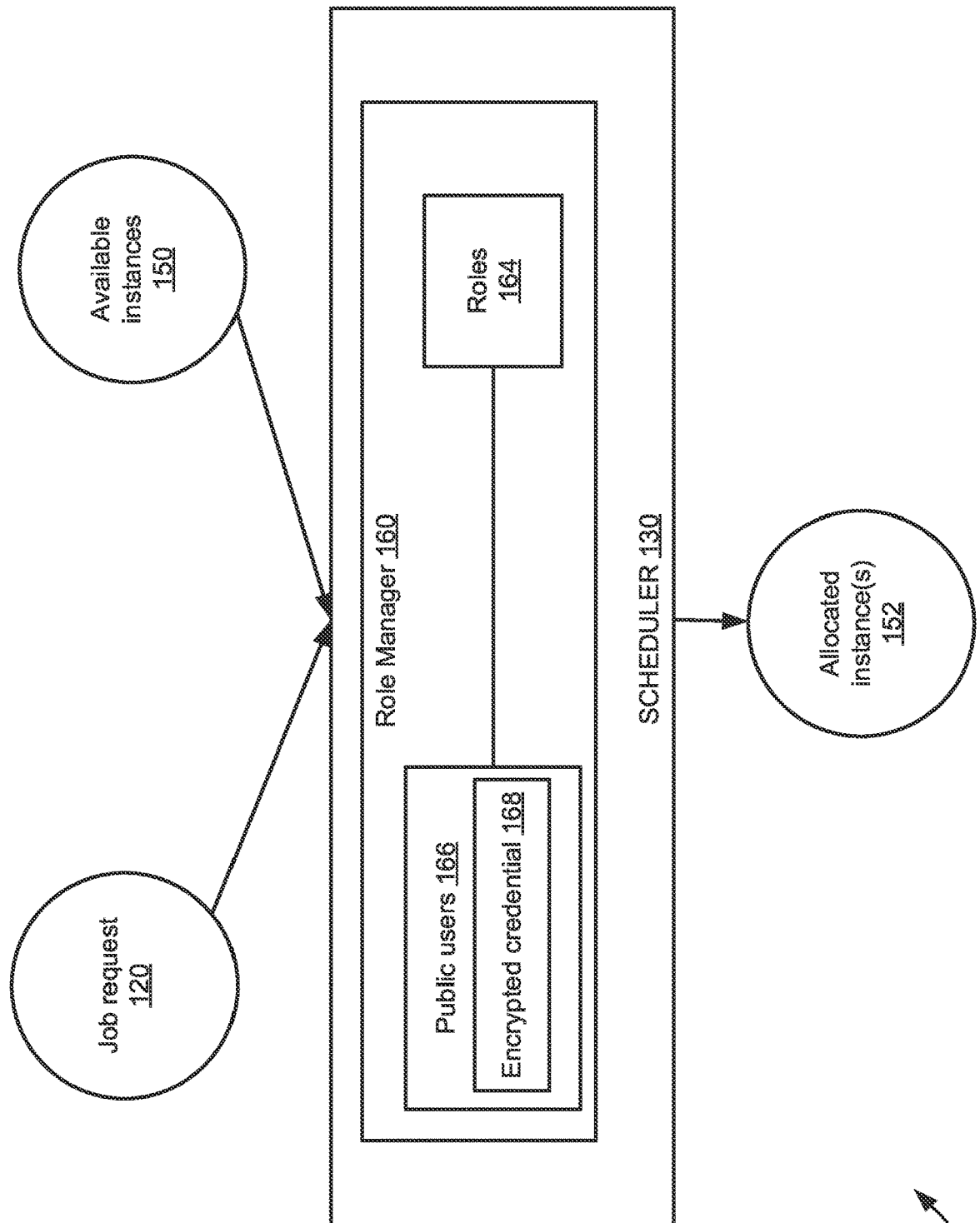
FIG. 8 is a block diagram illustrating an example data flow involving a scheduler implementing the role-based user privilege management.

FIG. 8 is a block diagram 800 illustrating an example data flow involving the scheduler 130 implementing the role-based user privilege management. As noted above, the role manager 160 can have a plurality of predefined public users 166. Each public user 166 can have its respectively encrypted login credential 168 (e.g., username and password) that has been authenticated by default, i.e., the public user 166 is pre-authorized to use services provided by the DBaaS platform 140. As described herein, each predefined role 164 can be associated with or mapped to at least one public user 166. A public user 166 associated with or mapped to a role 164 can inherit all privileges contained in that role 164. In certain embodiments, a public user 166 can be associated with or mapped to multiple roles 164. In such cases, the public user 166 can inherit all privileges contained in each of the multiple roles 164 associated with or mapped to the public user 166.

When the scheduler 130 receives the job request 120, the role manager 160 can (after verifying the user has privileges for executing the job, as described further below) map the user to one or more predefined roles 164, as described above. Next, through the role manager 160, a public user 166 can be associated with or mapped to the one or more predefined roles 164 mapped to the user. Then the role manager 160 can modify the job request 120 by replacing the user's login credential (e.g., 114) with the encrypted credential 168 of the public user 166 that has been mapped to the one or more predefined roles 164. The scheduler 130 can then forward the modified job request to the DBaaS platform 140, which can select from the available instances 150 one or more instances 152 to be assigned to the user. The scheduler 130 can then schedule these assigned instances 152 for job execution.

In contrast to conventional user privilege management method where the DBaaS platform is directly responsible to grant, alter, or revoke users' privileges through SQL commands, the role-based user management method described herein operates through protocols. Specifically, the DBaaS platform can use the scheduler as an intermediary, which can map large groups of users into certain predefined roles, each of which has a respective combination of privileges. Thus, the DBaaS platform only needs to deal with a limited number of predefined roles in the scheduler.

Figure 9:
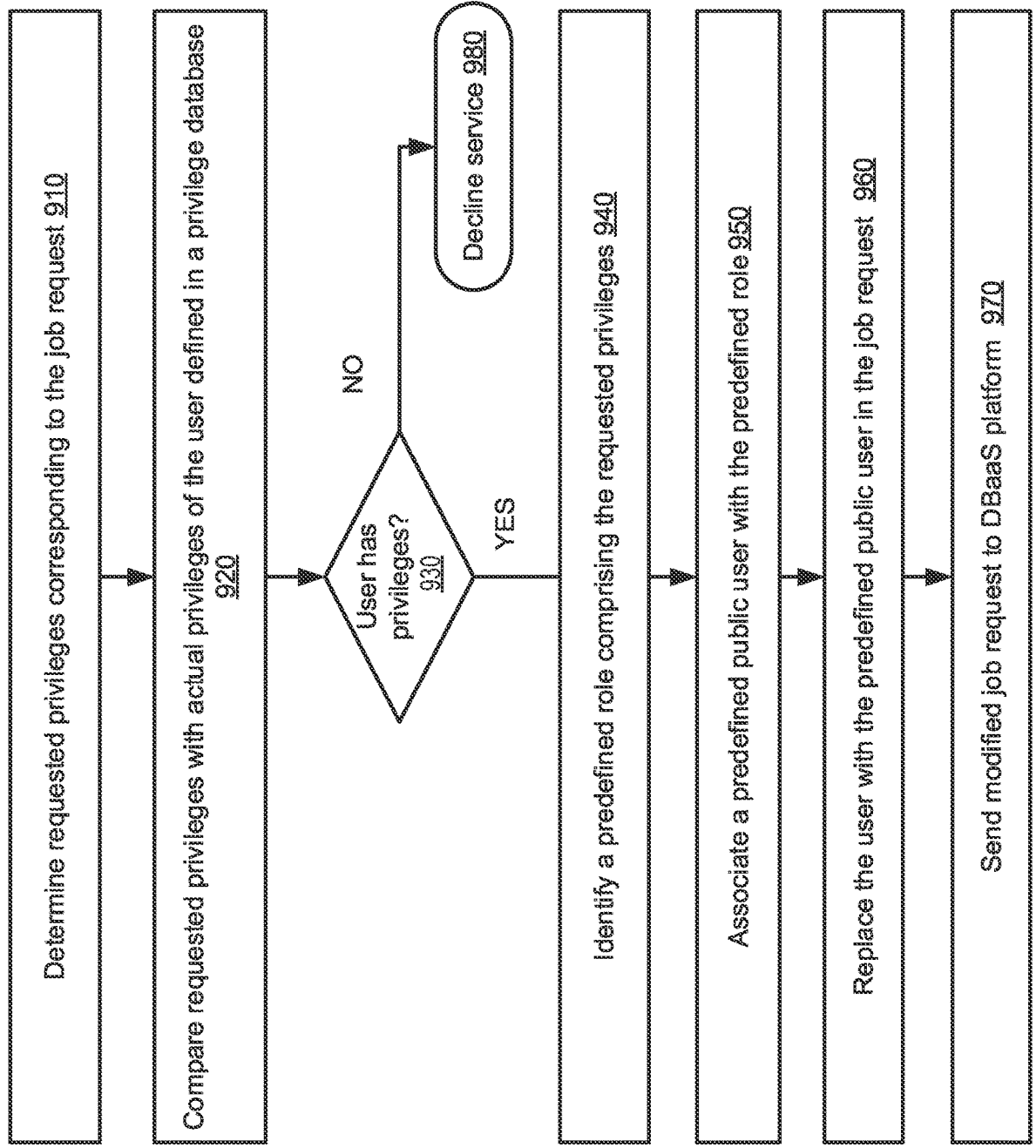
FIG. 9 is a flowchart illustrating an example method of implementing the role-based user privilege management.

FIG. 9 a flowchart 900 illustrating an example method of implementing the role-based user privilege management, which can be implemented, e.g., by the role manager 160.

At 910, requested privileges corresponding to a job request (e.g., 120) can be determined. The requested privileges are privileges sought by the job request. For example, a job request containing the task of deleting some data records from certain database tables will need a DELETE privilege to related database object, a job request sought to perform some DBaaS administrative work will need a special privilege to visit the DBaaS platform administration website, etc. As noted above, in certain cases, the requested privileges can be contained in the job request in a configuration format. In an example embodiment, the privilege checker 162 can be configured to analyze the job request to determine what privileges are sought by the job request. At 920, the requested privileges can be compared with actual privileges of the user, e.g., by the privilege checker 162. As noted above, the actual privileges of the user can be saved in the privilege database 180. Typically, actual privileges are assigned to the user when the user registers with the DBaaS platform. In certain embodiments, the user's actual privileges stored in the privilege database 180 can be specified in a configuration format. For example, the actual privileges assigned to a user can be: {disk: <256 GB; memory: <64 GB; CPU: <32; operation: r+w; database explorer: 2; ERP: no}, which indicates that the user is limited to 256 GB disk space, 64 GB memory space, and 32 CPUs, has read and write access rights to the database, and the access right to the regular database explorer (e.g., assuming the following predefined codes: 1=no access right, 2=access right to regular database explore, and 3=access right to the administrative database explorer), but have no access right to the ERP software application.

If the condition check at 930 determines that the requested privileges exceed the actual privileges assigned to the user, the user's job request will be declined at 980. Otherwise, the method will proceed to 940, where the scheduler can identify a predefined role (e.g., 164) mapped to the user, i.e., the predefined role includes all requested privileges sought by the user's job request. Next at 950, the scheduler can associate a predefined public user (e.g., 166) with the predefined role. As noted above, the public user has its own encrypted, pre-authenticated login credential, and will inherit all privileges of the predefined role. Then at 960, the scheduler can replace the user with the public user in the job request. Specifically, the user's login credential (e.g., 114) contained in the job request is replaced with the public user's encrypted login credential (e.g., 168). Such modified job request can then be submitted to the DBaaS platform at 970 for assignment of instances to the user. Because the public user has been pre-authenticated and have all requested privileges, the DBaaS platform can assign an instance to the user for job execution so long as there are instances available for allocation or assignment. Importantly, because the user's login credential is absent in the modified job request, it cannot be leaked to or stolen by other users who have access to the same DBaaS platform.

When the schedule submits a modified job request to the DBaaS platform, the scheduler can establish a new session with the DBaaS platform. A job console can generate a session log during execution of the job. For example, each job can be associated with a respective job log which contains a message thread tracing the job's execution, and the job log can be viewed by a web browser or other means. The conventional job log, however, cannot reveal real user information with role involvement. As described herein, the scheduler can have its own internal logging mechanism. For example, the scheduler can also record, e.g., via the logger 132, internal logs 134 containing user/role mapping details described above. Thus, users can search the internal logs 134 for more details of a job (e.g., by entering a job identifier), such as checking the user-role mapping information, error exceptions, and other job execution details.

Example 9—Example Advantages

A number of advantages can be achieved via the technology described herein. In particular, the scheduler 130, besides performing conventional tasks such as DBaaS platform selection and job scheduling, can play a more central role in user authentication and privilege management. Accordingly, by offloading user authentication and privilege management functions from the DBaaS platforms 140 to the scheduler 130, the database system 100 can have a more streamlined infrastructure, and operate with improved security and higher efficiency. For example, compared to the previous method of direct user authentication by the DBaaS platforms, the triple-side authentication scheme described herein adds another layer (i.e., scheduler) in between. In conjunction with the dynamic cookies preserved on the scheduler, the triple-side authentication scheme can not only reduce the workload of DBaaS platforms (e.g., authenticating users), but also improve the security of authentication process. The security can be further enhanced by the replacement of a user's login credential in job requests with a public user's encrypted credential, as described above. As another example, the technology described herein can greatly simplify the complexity of user privilege management by moving away from the conventional SQL commands-based privilege management model and embracing the protocol-based privilege management model (e.g., via user-role mapping). By shifting the user privilege management responsibility from the DBaaS platforms to the scheduler, the computing resources of the DBaaS platforms can be devoted to handle instances for job execution instead of administrative tasks (e g, managing users' privileges), which can be voluminous as the number of users increases.

Example 10—Example Computing Systems

Figure 10:
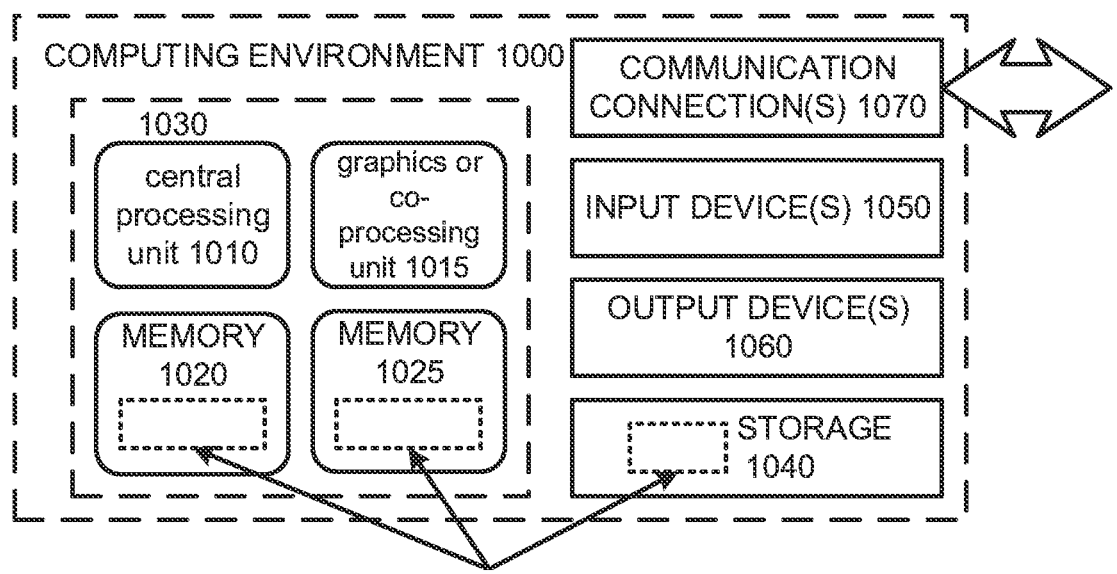
FIG. 10 is a block diagram of an example computing system in which the described embodiments can be implemented.

FIG. 10 depicts an example of a suitable computing system 1000 in which the described innovations can be implemented. The computing system 1000 is not intended to suggest any limitation as to scope of use or functionality of the present disclosure, as the innovations can be implemented in diverse computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 can be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 can have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 can be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software implementing one or more innovations described herein.

The input device(s) 1050 can be an input device such as a keyboard, mouse, pen, or trackball, a voice input device, a scanning device, touch device (e.g., touchpad, display, or the like) or another device that provides input to the computing system 1000. The output device(s) 1060 can be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 11—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 12—Example Cloud Computing Environment

Figure 11:
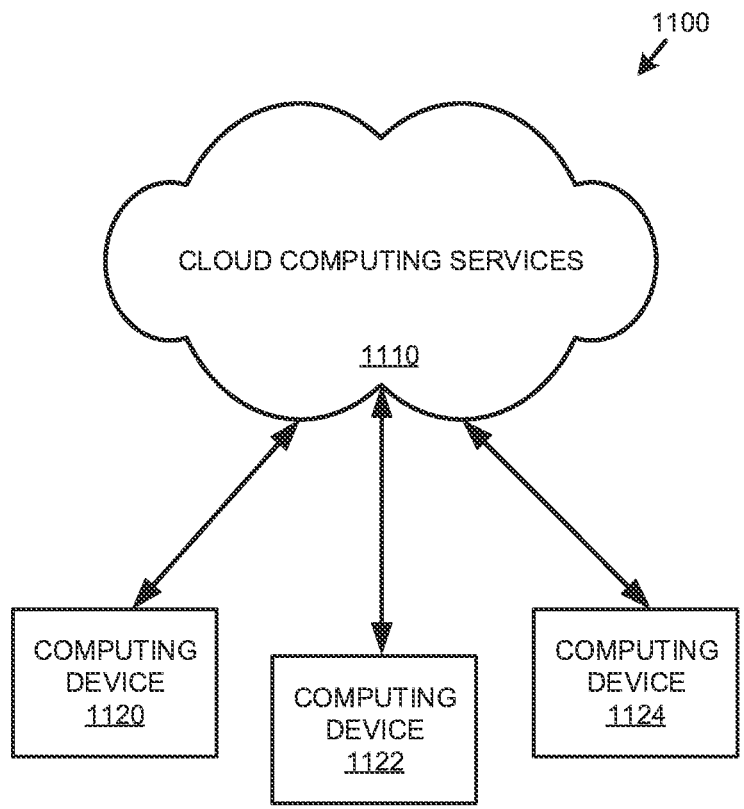
FIG. 11 is a block diagram of an example cloud computing environment that can be used in conjunction with the technologies described herein.

FIG. 11 depicts an example cloud computing environment 1100 in which the described technologies can be implemented, including, e.g., the system disclosed above and other systems herein. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1123. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

In practice, cloud-based, on-premises-based, or hybrid scenarios can be supported.

Example 13—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 14—Example Embodiments

Any of the following embodiments can be implemented.

Clause 1. A computer-implemented method comprising: authenticating a login credential of a user by a scheduler, wherein the user sends an original job request comprising the login credential for a database service; verifying the user has privileges for the original job request by the scheduler; creating a modified job request from the original job request by the scheduler based on a predefined role corresponding to the privileges of the user; sending the modified job request from the scheduler to a database service platform; and allocating an instance of database service to the user by the database service platform in response to the modified job request.

Clause 2. The method of clause 1, wherein verifying the user has privileges for the original job request comprises determining actual privileges assigned to the user contain requested privileges of the job request.

Clause 3. The method of any one of clauses 1-2, further comprising mapping the user to the predefined role, wherein the predefined role comprises a combination of privileges for accessing the database service platform.

Clause 4. The method of clause 3, further comprising associating a predefined public user with the predefined role, wherein the public user has an encrypted login credential that has been pre-authenticated to access the database service platform.

Clause 5. The method of clause 4, wherein creating the modified job request comprises replacing the login credential of the user with the encrypted login credential of the public user in the job request.

Clause 6. The method of any one of clauses 1-5, wherein authenticating the login credential of the user comprises authenticating the user by the scheduler and authenticating the scheduler by the database service platform.

Clause 7. The method of clause 6, wherein authenticating the user by the scheduler comprises decrypting a cookie stored on the scheduler using a private key of the user.

Clause 8. The method of clause 7, wherein authenticating the user by the scheduler further comprises periodically changing the login credential of the user and updating the cookie stored on the scheduler.

Clause 9. The method of clause 8, wherein updating the cookie comprises: submitting a job identifier from the user to the scheduler; returning a public key from the scheduler to the user; validating the public key by the user; sending the login credential of the user to the scheduler; selecting an asymmetric encryption algorithm by the scheduler; generating an encrypted login credential by the user using the asymmetric encryption algorithm selected by the scheduler; sending the encrypted login credential from the user to the scheduler; and storing the encrypted credential in the cookie by the scheduler.

Clause 10. The method of any one of clauses 1-9, further comprising logging the job request, results of user authentication, the predefined role corresponding to the privileges of the user, and status of allocating the instance of database service.

Clause 11. A system comprising: memory; one or more hardware processors coupled to the memory; and one or more computer readable storage media storing instructions that, when loaded into the memory, cause the one or more hardware processors to perform operations comprising: authenticating a login credential of a user by a scheduler, wherein the user sends an original job request comprising the login credential for a database service; verifying the user has privileges for the original job request by the scheduler; reating a modified job request from the original job request by the scheduler based on a predefined role corresponding to the privileges of the user; sending the modified job request from the scheduler to a database service platform; and allocating an instance of database service to the user by the database service platform in response to the modified job request.

Clause 12. The system of clause 11, wherein verifying the user has privileges for the original job request comprises determining actual privileges assigned to the user contain requested privileges of the job request.

Clause 13. The system of any one of clauses 11-12, wherein the operations further comprise mapping the user to the predefined role, wherein the predefined role comprises a combination of privileges for accessing the database service platform.

Clause 14. The system of any one of clauses 11-13, wherein the operations further comprise associating a predefined public user with the predefined role, wherein the public user has an encrypted login credential that has been pre-authenticated to access the database service platform.

Clause 15. The system of clause 14, wherein creating the modified job request comprises replacing the login credential of the user with the encrypted login credential of the public user in the job request.

Clause 16. The system of any one of clauses 11-15, wherein authenticating the login credential of the user comprises authenticating the user by the scheduler and authenticating the scheduler by the database service platform.

Clause 17. The system of clause 16, wherein authenticating the user by the scheduler comprises decrypting a cookie stored on the scheduler using a private key of the user.

Clause 18. The system of clause 17, wherein authenticating the user by the scheduler further comprises periodically changing the login credential of the user and updating the cookie stored on the scheduler.

Clause 19. The system of clause 18, wherein updating the cookie comprises: submitting a job identifier from the user to the scheduler; returning a public key from the scheduler to the user; validating the public key by the user; sending the login credential of the user to the scheduler; selecting an asymmetric encryption algorithm by the scheduler; generating an encrypted login credential by the user using the asymmetric encryption algorithm selected by the scheduler; sending the encrypted login credential from the user to the scheduler; and storing the encrypted credential in the cookie by the scheduler.

Clause 20. One or more computer-readable media having encoded thereon computer-executable instructions causing one or more processors to perform a method comprising: authenticating a login credential of a user by a scheduler, wherein the user sends an original job request comprising the login credential for a database service; verifying the user has privileges for the original job request by the scheduler; mapping the user to a predefined role, wherein the predefined role comprises a combination of privileges for accessing the database service platform; associating a predefined public user with the predefined role, wherein the public user has an encrypted login credential that has been pre-authenticated to access the database service platform; creating a modified job request by the scheduler by replacing the login credential of the user with the encrypted login credential of the public user in the job request; sending the modified job request from the scheduler to a database service platform; and allocating an instance of database service to the user by the database service platform in response to the modified job request.

Example 15—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
 authenticating a login credential of a user by a scheduler, wherein the login credential is included in an original service request of the user for a database service;
 determining the user has privileges for the original service request by the scheduler;
 creating a modified service request from the original service request by the scheduler based on a predefined role corresponding to the privileges of the user; and
 forwarding, by the scheduler, the modified service request to a database-as-a-service (DBaaS) platform, wherein an instance of database service can be assigned to the user in response to the modified service request,
 wherein authenticating the login credential of the user comprises authenticating the user by the scheduler and authenticating the scheduler by the DBaaS platform,
 wherein authenticating the user by the scheduler comprises decrypting a cookie stored on the scheduler using a private key of the user,
 wherein authenticating the user by the scheduler further comprises changing the login credential of the user and refreshing the cookie stored on the scheduler,
 wherein refreshing the cookie comprises:
  sending a public key from the scheduler to the user;
  validating the public key by the user;
  sending the login credential of the user to the scheduler;
  determining an asymmetric encryption algorithm by the scheduler;
  generating an encrypted login credential by the user using the asymmetric encryption algorithm determined by the scheduler;
  sending the encrypted login credential from the user to the scheduler; and
  storing the encrypted credential in the cookie by the scheduler.

2. The method of claim 1, wherein determining the user has privileges for the original service request comprises determining predefined privileges of the user contain requested privileges of the service request.

3. The method of claim 1, further comprising mapping the user to the predefined role, wherein the predefined role comprises a combination of privileges for accessing the DBaaS platform.

4. The method of claim 3, further comprising mapping a predefined public user to the predefined role, wherein the public user has an encrypted login credential that has been pre-authenticated to access the DBaaS platform.

5. The method of claim 4, wherein creating the modified service request comprises replacing the login credential of the user with the encrypted login credential of the public user in the service request.

6. The method of claim 1, further comprising logging the service request, results of user authentication, and the predefined role corresponding to the privileges of the user.

7. A system comprising:
 memory;
 one or more hardware processors coupled to the memory; and
 one or more computer readable storage media storing instructions that, when loaded into the memory, cause the one or more hardware processors to perform operations comprising:
 authenticating a login credential of a user by a scheduler, wherein the login credential is included in an original service request of the user for a database service;
 determining the user has privileges for the original service request by the scheduler;
 creating a modified service request from the original service request by the scheduler based on a predefined role corresponding to the privileges of the user;
 forwarding, by the scheduler, the modified service request to a database-as-a-service (DBaaS) platform; and
 assigning an instance of database service to the user in response to the modified service request,
 wherein authenticating the login credential of the user comprises authenticating the user by the scheduler and authenticating the scheduler by the DBaaS platform,
 wherein authenticating the user by the scheduler comprises decrypting a cookie stored on the scheduler using a private key of the user,
 wherein authenticating the user by the scheduler further comprises changing the login credential of the user and refreshing the cookie stored on the scheduler,
 wherein refreshing the cookie comprises:
  sending a public key from the scheduler to the user;
  validating the public key by the user;
  sending the login credential of the user to the scheduler;
  determining an asymmetric encryption algorithm by the scheduler;
  generating an encrypted login credential by the user using the asymmetric encryption algorithm determined by the scheduler;
  sending the encrypted login credential from the user to the scheduler; and
  storing the encrypted credential in the cookie by the scheduler.

8. The system of claim 7, wherein determining the user has privileges for the original service request comprises determining predefined privileges of the user contain requested privileges of the service request.

9. The system of claim 7, wherein the operations further comprise mapping the user to the predefined role, wherein the predefined role comprises a combination of privileges for accessing the DBaaS platform.

10. The system of claim 7, wherein the operations further comprise mapping a predefined public user to the predefined role, wherein the public user has an encrypted login credential that has been pre-authenticated to access the DBaaS platform.

11. The system of claim 10, wherein creating the modified service request comprises replacing the login credential of the user with the encrypted login credential of the public user in the service request.

12. The system of claim 7, further comprising logging the service request, results of user authentication, and the predefined role corresponding to the privileges of the user.

13. One or more non-transitory computer-readable media containing program instructions for causing a computer to perform a method comprising:
   authenticating a login credential of a user by a scheduler, wherein the login credential is included in an original service request of the user for a database service;
   determining the user has privileges for the original service request by the scheduler;
   mapping the user to a predefined role, wherein the predefined role comprises a combination of privileges for accessing a database-as-a-service (DBaaS) platform;
   mapping a predefined public user to the predefined role, wherein the public user has an encrypted login credential that has been pre-authenticated to access the DBaaS platform;
   creating a modified service request by the scheduler by replacing the login credential of the user with the encrypted login credential of the public user in the service request;
   forwarding, by the scheduler, the modified service request to the DBaaS platform; and
   assigning an instance of database service to the user in response to the modified service request,
   wherein authenticating the login credential of the user comprises authenticating the user by the scheduler and authenticating the scheduler by the DBaaS platform,
   wherein authenticating the user by the scheduler comprises decrypting a cookie stored on the scheduler using a private key of the user,
   wherein authenticating the user by the scheduler further comprises changing the login credential of the user and refreshing the cookie stored on the scheduler,
   wherein refreshing the cookie comprises:
      sending a public key from the scheduler to the user;
      validating the public key by the user;
      sending the login credential of the user to the scheduler;
      determining an asymmetric encryption algorithm by the scheduler;
      generating an encrypted login credential by the user using the asymmetric encryption algorithm determined by the scheduler;
      sending the encrypted login credential from the user to the scheduler; and
      storing the encrypted credential in the cookie by the scheduler.

* * * * *